Patented Aug. 10, 1948

UNITED STATES PATENT OFFICE 2,446,606

PRODUCTION OF VANILLIC ACID

Irwin A. Pearl, Appleton, Wis., assignor, by mesne assignments, to Sulphite Products Corporation, a corporation of Wisconsin No Drawing. Application September 6, 1945, Serial No. 614,828

3 Claims. (Cl. 260—521)

My invention relates to the transformation of vanillin and other aldehydes such as, syringaldehyde and ortho-vanillin, not susceptible to the ordinary Cannizzaro reaction, to the derived monocarboxylic acids. In my prior Patent 2,419,158, patented April 15, 1947, the primary reaction between silver oxide and the aldehyde in a warm solution with caustic alkali is fully disclosed. The products of that reaction are the alkali metal salt of the derived acid and metallic silver. An obvious and non-inventive way of getting the silver back into the form of silver oxide would be to dissolve it in nitric acid and then precipitate with caustic alkali.

I have discovered that finely divided metallic silver, at least in the form resulting from the performance of the primary reaction, can be transformed back to the oxide without being put into solution as a soluble silver salt.

EXAMPLE 1

Reoxidation of precipitated silver

The wet silver residue (6.0 atoms) from the oxidation of 912 grams (6.0 mols) of vanillin with 696 grams (3.0 mols) of freshly prepared silver oxide in alkaline solution according to the process of my prior Patent 2,419,158, was gradually added to a well-stirred solution of 400 grams (2.5 mols) of potassium permanganate in 2 liters of water. After several minutes, the solution turned deep green. A little more potassium permanganate was added, and the red color returned. The solution was filtered, and the precipitate was washed until the washings became colorless.

EXAMPLE 2

Utilization of reoxidized silver

The silver oxide, which appeared as an almost black powder was transferred to a large battery jar, covered with 3.5 gallons of water, and treated with stirring with 720 grams (18 mols) of sodium hydroxide. The temperature at this point was approximately 50°. With vigorous stirring, 912 grams (6.0 mols) of vanillin were added at one time. Reaction set in, the silver oxide was reduced to fluffy metallic silver, abundant gas evolution took place, and the temperature rose to 75°. The mixture was stirred until the temperature dropped to 70° and allowed to stand until cool. The mixture was filtered and the silver was washed with water. The combined filtrate and washings were acidified with hydrochloric acid. The thick white precipitate which separated was filtered after cooling, washed with dilute sodium bisulfite solution and with water, and finally dried. A yield of 995 grams (98%) of vanillic acid, melting at 209–210°, was obtained.

EXAMPLE 3

Second reoxidation

The silver residue obtained in Example 2 was again reoxidized according to Example 1 and the reoxidized product was used again as in Example 2. Apparently it is possible to continue the repeated reduction and reoxidation indefinitely.

If the washing of the reoxidized silver does not completely remove manganese compounds, the trace of manganese in the next vanillin reaction may cause a slight discoloration of the product. If this is objectionable it can be avoided either by more thorough washing or by putting the silver through several cycles according to the invention and then through one cycle involving the prior art procedure of dissolving the silver in nitric acid, crystallizing the silver nitrate and reprecipitating the oxide from the nitrate with caustic alkali.

Without further elaboration the foregoing will so fully explain my invention that others may readily adapt the same for use under various conditions of service. It will, for instance, be obvious that the partially reduced manganese compounds may be reoxidized to permanganate by conventional procedures well-known in the art and that for quantity production, sodium permanganate will be more convenient than potassium permanganate. The relatively inert aldehydes to which the invention is applicable include substituted aromatic aldehydes substituted in 2 or 4 position with hydroxy, amino, or substituted amino having substituents less reactive than the aldehyde group.

I claim:

1. The method of producing vanillic acid from vanillin, which comprises: subjecting the aldehyde in aqueous solution with excess alkali, to reaction with the alkali and suspended silver oxide; separating the precipitated silver; oxidizing the precipitated silver by means of an aqueous solution of a salt of permanganic acid substantially in the proportion of six atom weights of silver and 2.5 moles of such salt in 2 liters of water and employing the regenerated silver oxide to process an additional quantity of aldehyde.

2. The steps in the method of producing the derived monocarboxylic acid from an aromatic aldehyde selected from the class consisting of vanillin, syringaldehyde and ortho-vanillin, which comprises: subjecting the aldehyde in aqueous solution with excess alkali, to reaction with the alkali and suspended silver oxide; separating the resulting precipitated silver; oxidizing the precipitated silver by means of an aqueous solution of a salt of permanganic acid in the proportion of about 6 atom weights of silver to 2.5 moles of such salt in 2 liters of water; and employing the regenerated silver oxide to convert an additional quantity of aldehyde to acid.

3. The method of deriving the corresponding acid from an aldehyde selected from the class consisting of vanillin, syringaldehyde and orthovanillin which consists in subjecting the aldehyde in aqueous solution in the presence of excess alkali to reaction with the alkali and suspended silver oxide, separating the resulting precipitated silver, oxidizing the precipitated silver by means of an aqueous solution of an alkali metal salt of permanganic acid in the proportion of about 6 atom weights of silver to about 2.5 moles of permanganate salt, and employing the regenerated silver oxide to convert an additional quantity of aldehyde to acid.

IRWIN A. PEARL.

REFERENCES CITED

The following references are of record in the file of this patent:

UNITED STATES PATENTS

| Number | Name | Date |
|---|---|---|
| 1,043,646 | Turner | Nov. 5, 1912 |
| 2,228,920 | Eckert | Jan. 14, 1941 |
| 2,312,864 | Bindler | Mar. 2, 1943 |
| 2,419,158 | Pearl | Apr. 15, 1947 |

OTHER REFERENCES

"Chemical News," vol. 15 (1867), p. 204, article by Giles.

"American Journal of Science," 3rd Series, vol. 44 (1892), p. 445, article by Lea.

"Chemical News," vol. 115 (1917), p. 73, article by Foster.

"Chemical Abstracts," vol. 27 (1933), p. 5230, article by Voznesenskii et al.